US011270087B2

(12) United States Patent
Wang (10) Patent No.: US 11,270,087 B2
(45) Date of Patent: Mar. 8, 2022

(54) OBJECT SCANNING METHOD BASED ON MOBILE TERMINAL AND MOBILE TERMINAL

(71) Applicant: TENCENT TECHNOLOGY (SHENZHEN) COMPANY LIMITED, Guangdong (CN)

(72) Inventor: Yi Ran Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 566 days.

(21) Appl. No.: 16/352,955

(22) Filed: Mar. 14, 2019

(65) Prior Publication Data
US 2019/0205576 A1  Jul. 4, 2019

Related U.S. Application Data

(63) Continuation of application No. PCT/CN2017/110898, filed on Nov. 14, 2017.

(30) Foreign Application Priority Data

Nov. 17, 2016  (CN) .......................... 201611012561.9

(51) Int. Cl.
*G06K 7/10*  (2006.01)
*H04L 29/08*  (2006.01)
(Continued)

(52) U.S. Cl.
CPC ........ *G06K 7/10257* (2013.01); *A63F 13/285* (2014.09); *A63F 13/358* (2014.09);
(Continued)

(58) Field of Classification Search
CPC . G06K 7/10257; A63F 13/285; A63F 13/358; A63F 13/44; A63F 13/5372;
(Continued)

(56) References Cited

U.S. PATENT DOCUMENTS 8,628,424 B1 * 1/2014 Kern ..................... A63F 13/798
463/42
9,329,678 B2 * 5/2016 Krauss ............. H04N 21/42226
(Continued)

FOREIGN PATENT DOCUMENTS

| CN | 102546937 A | 7/2012 |
|---|---|---|
| CN | 102968549 A | 3/2013 |
| CN | 106341427 A | 1/2017 |

OTHER PUBLICATIONS

International Search Report for PCT/CN2017/110898, dated Jan. 26, 2018.

*Primary Examiner* — Nam V Nguyen
(74) *Attorney, Agent, or Firm* — Sughrue Mion, PLLC (57) ABSTRACT

A method performed by one or more processors of a mobile terminal is provided. The method includes: identifying a monitoring object based on a scanning instruction that is entered in an application interface; starting, based on the scanning instruction, a scanning object for scanning the monitoring object; and displaying the scanning object, a scanning range of the scanning object, a scanned monitoring object in the scanning range, and a remaining life value of the scanned monitoring object.

20 Claims, 8 Drawing Sheets

(51) Int. Cl.
  *H04W 56/00* (2009.01)
  *A63F 13/285* (2014.01)
  *H04L 29/06* (2006.01)
  *A63F 13/5372* (2014.01)
  *A63F 13/58* (2014.01)
  *A63F 13/358* (2014.01)
  *A63F 13/75* (2014.01)
  *A63F 13/44* (2014.01)
  *H04M 1/7243* (2021.01)
  *H04M 1/72403* (2021.01)
  *A63F 13/2145* (2014.01)
  *A63F 13/822* (2014.01)
  *A63F 13/573* (2014.01)
  *H04L 67/75* (2022.01)
  *H04L 67/131* (2022.01)

(52) U.S. Cl.
  CPC .......... *A63F 13/44* (2014.09); *A63F 13/5372* (2014.09); *A63F 13/58* (2014.09); *A63F 13/75* (2014.09); *H04L 67/36* (2013.01); *H04L 67/38* (2013.01); *H04M 1/7243* (2021.01); *H04M 1/72403* (2021.01); *H04W 56/001* (2013.01); *A63F 13/2145* (2014.09); *A63F 13/573* (2014.09); *A63F 13/822* (2014.09)

(58) Field of Classification Search
  CPC ...... A63F 13/58; A63F 13/75; A63F 13/2145; A63F 13/573; A63F 13/822; H04L 67/36; H04L 67/38; H04M 1/72403; H04M 1/7243; H04W 56/001
  USPC .............................. 340/10.1; 455/502, 456.1
  See application file for complete search history.

(56) References Cited

U.S. PATENT DOCUMENTS

| | | | |
|---|---|---|---|
| 9,526,995 B2* | 12/2016 | Brunstetter | A63F 13/73 |
| 11,071,919 B2* | 7/2021 | Willette | A63F 13/86 |
| 2012/0162358 A1* | 6/2012 | Choi | H04M 1/72469 348/36 |
| 2014/0004951 A1 | 1/2014 | Kern et al. | |
| 2016/0041717 A1 | 2/2016 | Hammontree et al. | |

* cited by examiner

OBJECT SCANNING METHOD BASED ON MOBILE TERMINAL AND MOBILE TERMINAL

CROSS-REFERENCE TO RELATED APPLICATIONS

This application is a continuation of International Patent Application No. PCT/CN2017/110898, claims priority from Chinese Patent Application No. 201611012561.9, filed with the Chinese Patent Office on Nov. 17, 2016, and entitled "OBJECT SCANNING METHOD BASED ON MOBILE TERMINAL AND MOBILE TERMINAL", the disclosures of which are incorporated herein by reference in their entireties.

BACKGROUND

Field

Methods and apparatuses consistent with embodiments relate to Internet technologies, and specifically to object scanning based on a mobile terminal.

Description of Related Art

With the rapid development of the Internet, more and more Internet applications are being developed. Moreover, with the rapid development of intelligent mobile terminals, many applications that previously required a personal computer (PC) can be used on mobile terminals such as mobile phones.

However, a screen of a PC is relatively larger than that of a mobile terminal. In addition, different input techniques are used on mobile terminals. That is, a user usually operates an application on the PC by using a mouse, while the user can operate an application on the mobile terminal by using a touch object such as a finger controlling a cursor. As a result, it is more complex to operate an application running on the mobile terminal than on the PC.

Especially for some interactive applications, the user needs to frequently operate the interactive applications by using the mobile terminal to enable the interactive applications to implement corresponding functions. Consequently, it is more complex to operate the interactive applications on the mobile terminal.

SUMMARY

To resolve a problem of high complexity of operating an interactive application on a mobile terminal, various embodiments provide an object scanning method based on a mobile terminal, which can reduce interactive operations between a user and a mobile terminal through personalized interface setting, thereby reducing complexity of operating an interactive application on the mobile terminal. The embodiments further provide a corresponding mobile terminal.

According to an aspect of an embodiment, there is provided a method performed by one or more processors of a mobile terminal, the method includes: identifying a monitoring object based on a scanning instruction that is entered in an application interface; starting, based on the scanning instruction, a scanning object for scanning the monitoring object; and displaying the scanning object, a scanning range of the scanning object, a scanned monitoring object in the scanning range, and a remaining life value of the scanned monitoring object.

According to other aspects of one or more embodiments, there is also provided apparatuses, terminals, systems and non-transitory computer readable mediums consistent with the system above.

BRIEF DESCRIPTION OF THE DRAWINGS

The above and other aspects, features, and advantages of certain embodiments will be more apparent from the following description taken in conjunction with the accompanying drawings, in which.

DETAILED DESCRIPTION

Hereinafter, embodiments will be described in detail with reference to the accompanying drawings. The described embodiments may be variously modified and are not intended to limit the scope to the disclosure. All other embodiments obtained by a person skilled in the art based on the embodiments of this application without creative efforts shall fall within the protection scope of this application.

With the rapid development of the Internet, online competitive games are more and more popular among the public, and multiplayer online battle arena (MOBA) games are particularly popular. In the embodiments, the object scanning method based on a mobile terminal is to be described in detail by using an example in which an interactive application is MOBA.

A user playing MOBA on a computer may play with a mouse. Because a screen of the computer is large and an operation of the mouse by the user is flexible, the user can usually perform precise operations when playing MOBA on the computer. With intelligent development of mobile terminals such as mobile phones, many applications, especially interactive applications, can be operated on a mobile terminal. MOBA can also be operated on the mobile terminal. However, the mobile terminal usually has a small screen, and the user usually needs to perform an operation on a screen of a touchscreen using a finger, often causing inaccurate operations. In addition, the user needs to frequently interact with the mobile terminal to complete an operation of MOBA, causing high operation complexity.

Figure 1:
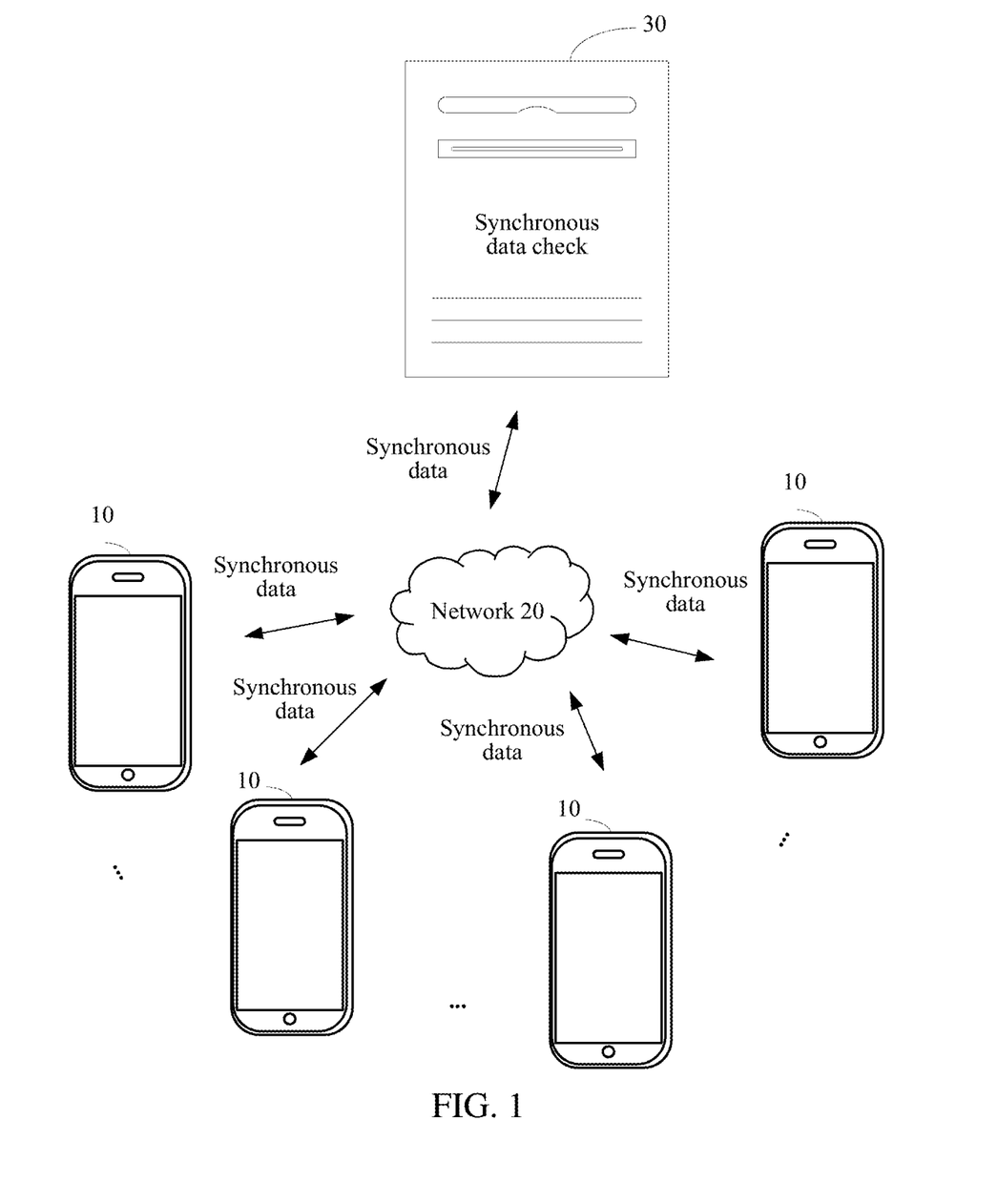
FIG. 1 is a schematic diagram of an embodiment of an object scanning system based on a mobile terminal according to an embodiment.

To resolve a problem of inaccurate operations and high operation complexity during playing of MOBA on a mobile terminal, an embodiment provides an object scanning system based on a mobile terminal. As shown in FIG. 1, the object scanning system includes multiple mobile terminals 10, a network 20, and a server 30. The mobile terminal 10 is in communication connection with the server 30 by using the network 20. MOBA is installed on each mobile terminal 10. A player plays the MOBA online with other players by using a mobile terminal 10.

In some cases, to ensure data consistency of the players, data of each player may be forwarded to another player by using the server 30. In other words, data on one mobile terminal 10 may be forwarded to another mobile terminal by using the server 30. The data may be used as synchronous data. To prevent some players from maliciously modifying the data and causing some game characters to have super high skills, the server 30 is configured not only to forward game data but also check synchronous data sent by each mobile terminal 10. The synchronous data sent by each mobile terminal 10 is usually sent in a form of a frame. The server checks these synchronized frames. When data in theses synchronized frames meets a preset game rule, the synchronized frames are delivered to each mobile terminal 10. Each mobile terminal 10 renders the data in the synchronized frames for display.

Checking by the server 30 can further ensure that a command is not repeatedly executed when repeated operations occur due to a poor network condition.

In this embodiment, a monitoring object and a scanning object are configured for a game character in the MOBA. The monitoring object is a monitoring guarder, or may be referred to as a "ward". The scanning object is a scanning guarder, or may be referred to as a dewarding item. The monitoring object and the scanning object both may be cheat items of the game character.

Figure 2:
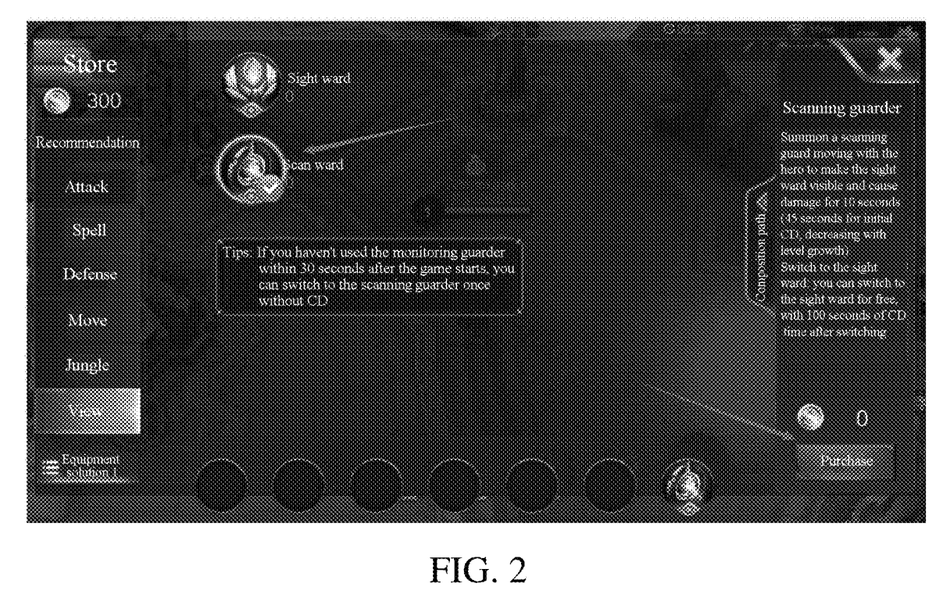
FIG. 2 is a schematic diagram of an example of an application interface according to an embodiment.

Both the monitoring guarder and the scanning guarder can be purchased in a store in the game. FIG. 2 shows a scanning guarder in the store. Use of the monitoring guarder and the scanning guarder is time-limited. That is, the monitoring guarder and the scanning guarder each have a life cycle. Once the monitoring guarder is inserted for monitoring, a countdown of the life cycle of the monitoring guarder starts. The monitoring guarder disappears as the life cycle expires, and the monitoring function ends. The scanning guarder also has a life cycle and automatically disappears as the life cycle expires, and the scanning function ends.

Figure 3:
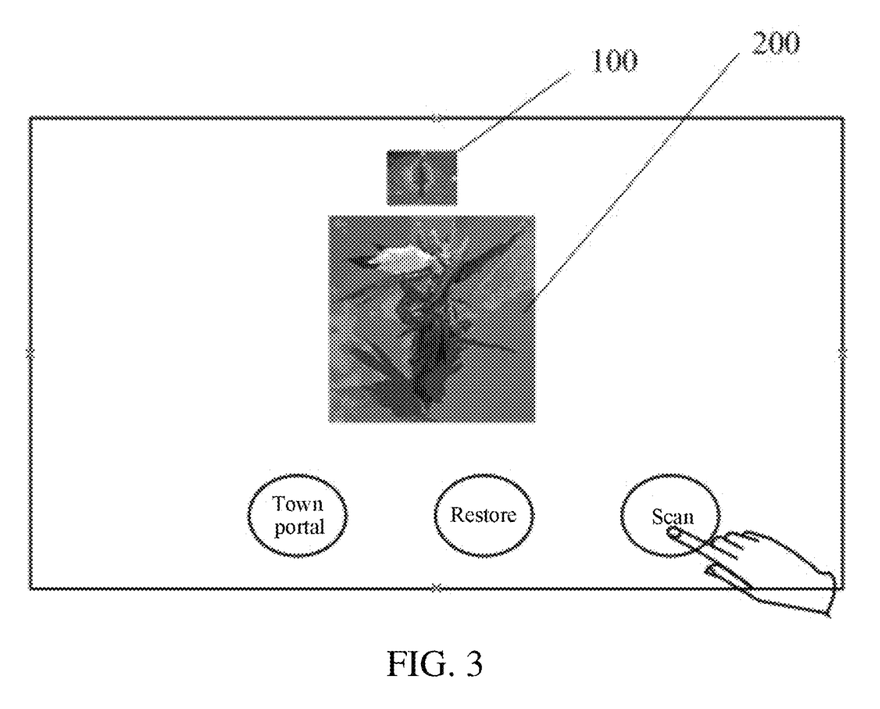
FIG. 3 is a schematic diagram of another example of an application interface according to an embodiment.

An application interface on the mobile terminal may be a MOBA interface. For example, as shown in FIG. 3, personalized setting of the application interface may be implemented by setting a scanning entry on the application interface. The scanning entry may be, for example, a scanning button. In this way, to start a scanning guarder for a game character of the user, the user may directly click the scanning button. The scanning guarder is the scanning object. Certainly, the scanning button shown in FIG. 3 is only one type of scanning entry. Other forms of scanning entries are also applicable to this embodiment.

In this embodiment, when playing MOBA on the mobile terminal, for example, the user only needs to click the scanning button shown in FIG. 3 to start a scanning object 100 in FIG. 3.

The scanning object 100 is usually located over the head of a main simulated object 200. The main simulated object 200 is a game character of a player in the game.

Figure 4:
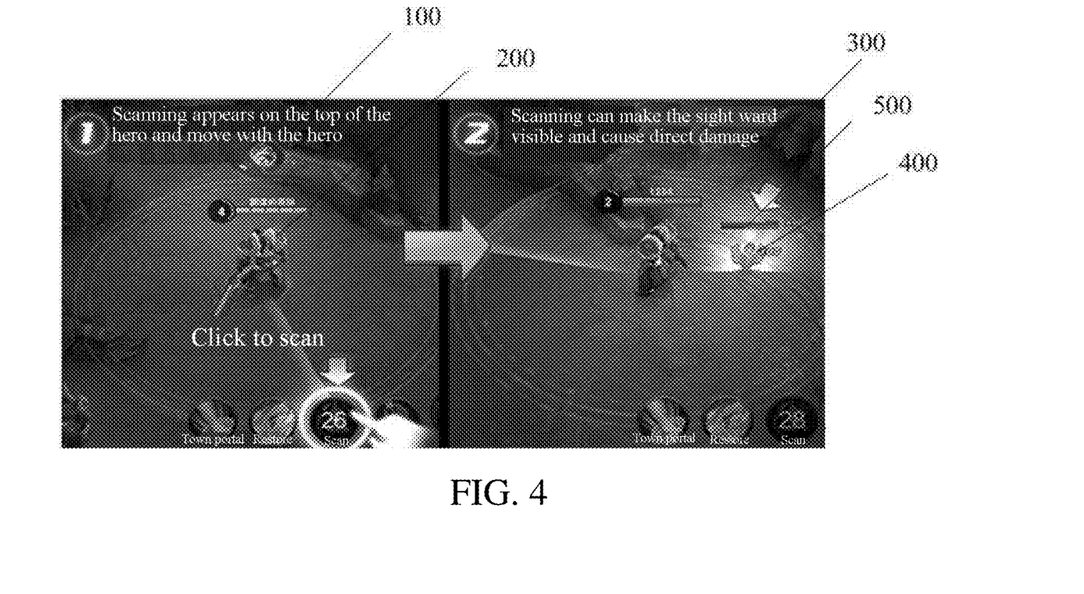
FIG. 4 is a schematic diagram of another example of an application interface according to an embodiment.

FIG. 4 shows a process from preparation for starting a scanning object to a phase after the scanning object is started.

As shown in FIG. 4, the user clicks the scanning button, to start the scanning guarder, that is, to start the scanning object 100. The scanning object 100 is located over the head of the main simulated object 200. The scanning object 100 casts a skill by using the main simulated object 200 as a center, determines a scanning range 300, and obtains a monitoring object 400 through scanning in the scanning range 300. The monitoring object 400 is the monitoring guarder. The monitoring object 400 becomes visible after being scanned. In addition, the scanning object 100 in this embodiment not only can scan the monitoring object 400 but also can attack the monitoring object 400 at the same time and reduce a remaining life value 500 of the monitoring object 400, to make the monitoring object 400 disappear, where the remaining life value 500 is health points of the monitoring object 400.

In this embodiment, the scanning object 100 appears in such a manner that a location of the main simulated object 200 is used as coordinates to cast a skill, and moves with the main simulated object 200, always remaining over the head of the main simulated object 200. The scanning function can make the monitoring object 400 from the enemy become visible. Once the monitoring object 400 from the enemy is exposed in the scanning range, the health points of the monitoring object 400 keep dropping until the health points is 0, and then the monitoring object 400 disappears.

Figure 5:
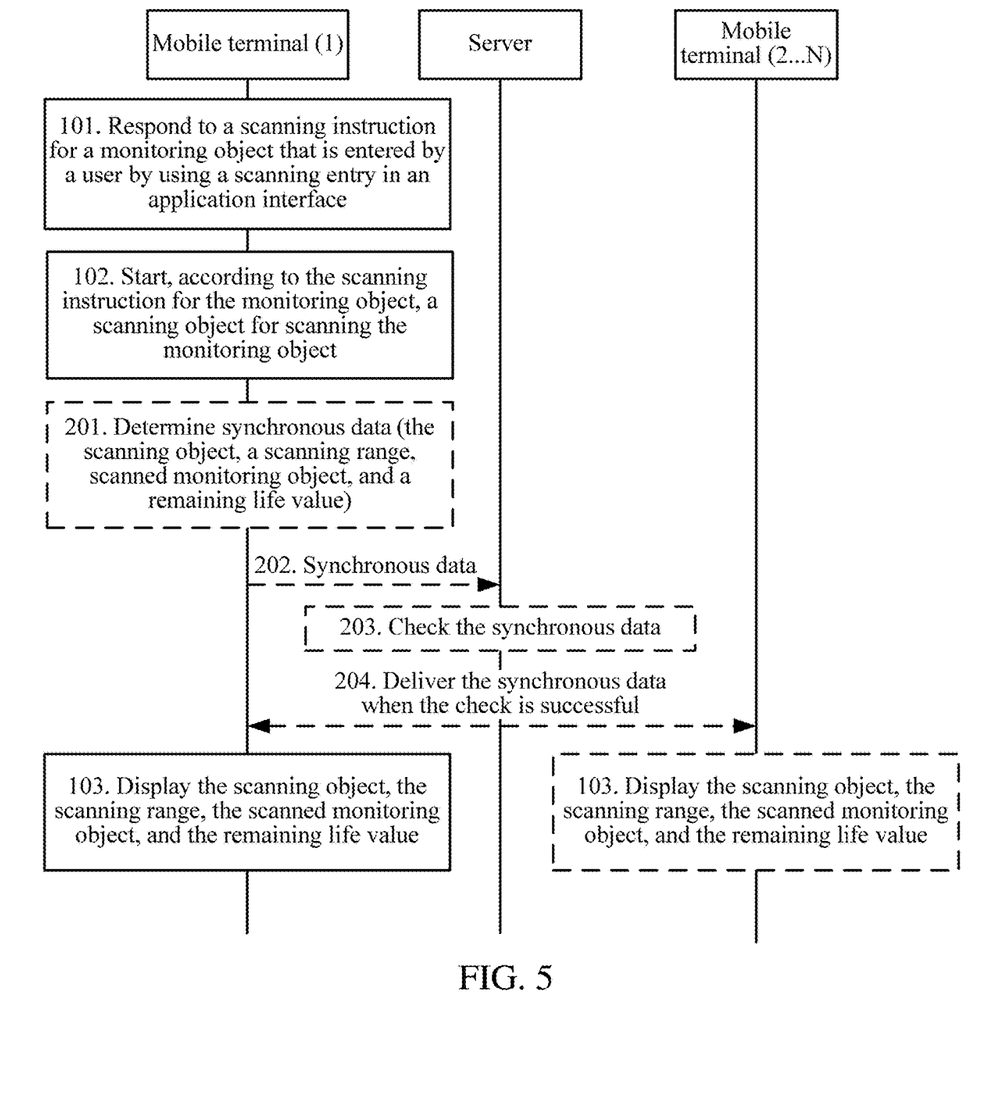
FIG. 5 is a schematic diagram of an embodiment of object scanning based on a mobile terminal according to an embodiment.

FIG. 5 is a schematic diagram of an embodiment of an object scanning method based on a mobile terminal according to the embodiments.

As shown in FIG. 5, the embodiment of the object scanning method based on a mobile terminal according to the embodiments includes the following steps:

101. The mobile terminal responds to a scanning instruction for a monitoring object that is entered by a user by using a scanning entry in an application interface. The mobile terminal may be any mobile terminal for playing a MOBA online, and is represented as a mobile terminal 1 in FIG. 5.

102. The mobile terminal starts, according to the scanning instruction for the monitoring object, a scanning object for scanning the monitoring object. The starting of the scanning object may be understood with reference to FIG. 3.

103. Display, on the mobile terminal, the scanning object, a scanning range of the scanning object, a scanned monitoring object in the scanning range, and a remaining life value of the scanned monitoring object.

The foregoing step 101 to step 103 may be shown by solid lines in FIG. 5.

In contrast to more complicated methods of operating an interactive application on a mobile terminal, in the object scanning method based on a mobile terminal that is provided in this embodiment of this application, a scanning instruction for a monitoring object that is entered by using a scanning entry in an application interface is used, and further a scanning object for scanning the monitoring object is started, to implement an operation of an interactive application. The object scanning method implements personalized setting of the application interface by using the scanning entry, so that a user only needs to enter the scanning instruction for the monitoring object into the scanning entry to implement the scanning function of the interactive application. This prevents complex operations on a mobile terminal before starting the scanning object, and reduces human-computer interactive operations, thereby reducing complexity of operating the interactive application on the mobile terminal.

The mobile terminal determines synchronous data such as the scanning object, a scanning range of the scanning object, a scanned monitoring object in the scanning range, and a remaining life value of the scanned monitoring object.

In some cases, for example, the interactive application is a MOBA. To ensure data consistency of players in the MOBA and prevent some players from maliciously modifying the data and causing some game characters to have super high skills, in an implementation, after the starting, according to the scanning instruction for the monitoring object, a scanning object for scanning the monitoring object, the foregoing method may further include the following steps:

201. The mobile terminal determines synchronous data, the synchronous data including the scanning object, a scanning range of the scanning object, a scanned monitoring object in the scanning range, and a remaining life value of the scanned monitoring object.
202. The mobile terminal sends the synchronous data to a server.
203. The server checks the synchronous data.
204. The server delivers the synchronous data to all mobile terminals when the synchronous data is successfully checked.

After receiving an instruction indicating that the synchronous data is successfully checked, each mobile terminal performs step 103. In this case, each mobile terminal can perform step 103.

In this case, the mobile terminal 1 is one of a plurality of mobile terminals, thereby implementing data synchronization of the mobile terminals.

The foregoing step 201 to step 204 and step 103 that is performed by another mobile terminal may be shown by dashed lines in FIG. 5. In an implementation, the displaying the scanning object, a scanning range of the scanning object, a scanned monitoring object in the scanning range, and a remaining life value of the scanned monitoring object may further include: displaying the scanning object above a main simulated object in the application interface, displaying the scanning range by using a location of the main simulated object as a center, and displaying the scanned monitoring object in the scanning range and the remaining life value of the scanned monitoring object.

In this embodiment, the scanning object is displayed on the top of the main simulated object. The main simulated object is a master game character in the game.

Displaying the scanning range by using the location of the main simulated object as a center makes the game scene more viscous and enhances visual experience of the user.

In an implementation, the method may further include:
obtaining a motion trajectory of the main simulated object;
controlling a movement of the scanning object and the scanning range according to the motion trajectory; and
displaying the main simulated object, the scanning object, and the scanning range after the movement.

In other words, in this embodiment, when the main simulated object moves, the scanning object and the scanning range also move with the main simulated object. This further enhances a visual effect.

In an implementation, the method may further include:
determining the remaining life value of the scanned monitoring object according to a scanning time and a speed at which the scanning object reduces health points of the scanned monitoring object; and
displaying the remaining life value of the scanned monitoring object, and controlling, when the remaining life value is 0, the scanned monitoring object to disappear from the application interface.

In this embodiment, the scanning object kills the monitoring object. A life of the monitoring object is measured by health points. Corresponding health points are deducted after the monitoring object is killed per second, until the health points are 0. A remaining life value, that is, remaining health points, is displayed after the health points are deducted.

In an implementation, when there are at least two scanned monitoring objects in the scanning range, the method further includes: controlling the scanning object to reduce health points of the at least two scanned monitoring objects in an order of reduction priorities, a reduction priority of a monitoring object with a smaller remaining life value being higher than a reduction priority of a monitoring object with a larger remaining life value; and reducing the health points of the at least two scanned monitoring objects in an order of remaining existence durations of the scanned monitoring objects when the remaining life values of the at least two scanned monitoring objects are the same.

In this embodiment, when the scanning object obtains through scanning at least two monitoring objects in the scanning range, because a capability of the scanning object is excessively consumed for killing multiple monitoring objects at the same time, the capability of the scanning object may be exhausted before killing off any monitoring object. Therefore, the scanning object reduces health points of the at least two monitoring objects in an order of reduction priorities. The reduction priorities are set based on remaining life values. The remaining life value is also remaining health points. Lower remaining health points correspond to a higher reduction priority. Health points of a monitoring object with a higher reduction priority are preferentially reduced. If the at least two scanned monitoring objects have a same remaining life value, a remaining existence duration of each monitoring object is considered. Each monitoring object has a life cycle. For example, the life cycle of the monitoring object may be 50 seconds. After the monitoring object is inserted, a countdown starts. After the time expires, the life of the monitoring object ends. To enable the scanning object to reduce health points of the monitoring objects more rapidly, the scanning object may preferentially reduce health points of a monitoring object with less remaining existence time in the at least two scanned monitoring objects. In an implementation, the starting, according to the scanning instruction for the monitoring object, a scanning object for scanning the monitoring object may further include:

determining, according to input frequency and a usage state of the scanning instruction, whether the scanning object is currently available; and
starting, according to the scanning instruction for the monitoring object when the input frequency of the scanning instruction meets a preset rule and the usage state indicates availability, the scanning object for scanning the monitoring object.

In this embodiment, a scanning skill cannot be frequently used, and usually needs to be used every 30 seconds or 45 seconds. Therefore, it needs to be first determined whether an interval between a current scanning instruction and a previous scanning instruction reaches a preset interval. In addition, it further needs to be determined whether the scanning skill is in an available state. If the scanning skill is disabled, the scanning object cannot be started.

Figure 6:
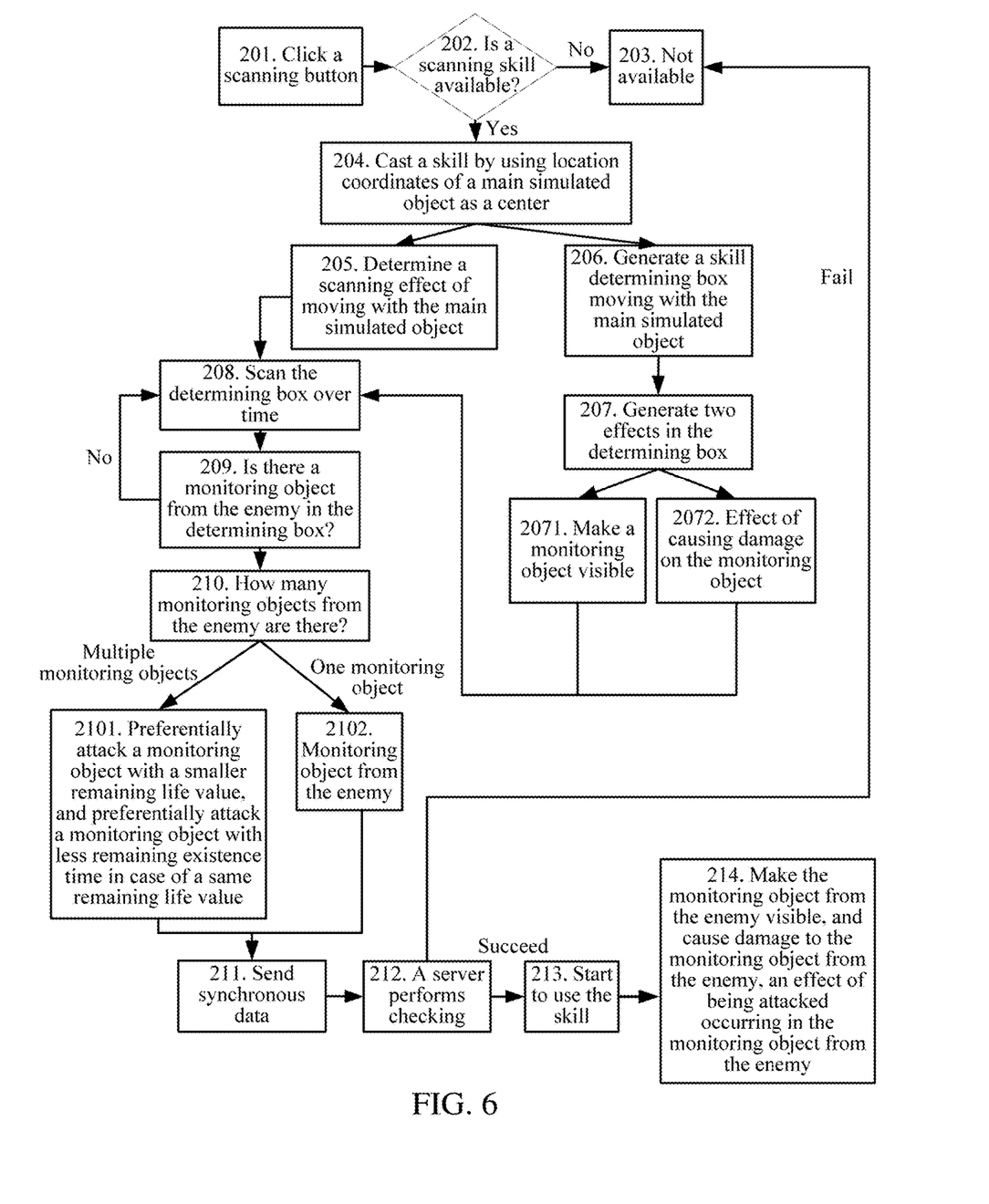
FIG. 6 is a schematic diagram of another embodiment of object scanning based on a mobile terminal according to an embodiment.

FIG. 6 is a schematic diagram of another object scanning method based on a mobile terminal according to an embodiment.

As shown in FIG. 6, the object scanning method based on a mobile terminal includes the following steps:

201. A player clicks a scanning button in an application interface of a mobile terminal A.
202. The mobile terminal A first determines locally whether a scanning skill is available.
203. If the scanning skill is not available, use of the scanning skill currently is invalid.
204. If the scanning skill is available, determine to use location coordinates of a main simulated object as a center to cast the skill.
205. Determine a scanning skill moving with the main simulated object.
206. Generate a skill determining box moving with the main simulated object.

When a character moves, the effect also moves simultaneously and remains over the head of the main simulated object. In addition, a program generates a skill determining box moving with the main simulated object at the same time. The skill determining box is a range in which a skill is casted. This range matches a skill effect range.

207. Generate two effects in the determining box.
2071. Make the monitoring object become visible. That is, the monitoring object changes from an invisible state to a visible state.
2072. Cause damage to the monitoring object. That is, an effect of reducing health points of the monitoring object from the enemy may be achieved, and the monitoring object disappears when the health points become 0.
208. Scan the determining box over time. With the duration of the scanning, the program scans the skill determining box over time. If a monitoring object from the enemy appears in the skill determining box, the skill effects in step 207 are triggered.
209. Determine whether there is a monitoring object from the enemy in the determining box.
210. Determine a quantity of monitoring objects from the enemy.
2101. If multiple monitoring objects from the enemy are obtained through scanning in the skill determining box, a damage order is set according to the following rules:
A monitoring object with a lower remaining life value is preferentially attacked.
In case of a same remaining life value, a monitoring object with less remaining existence time is preferentially attacked.
2102. When there is one monitoring object from the enemy, directly attack the monitoring object.
211. A program first sends synchronous data to a server after the skill effects in step 207 are triggered.
212. The server checks the synchronous data.
213. Start to use the skill if the checking succeeds.
214. The used skill includes:
capable of making the monitoring object become visible, that is, the monitoring object changes from an invisible state to a visible state; and
causing damage to the monitoring object, that is, an effect of reducing health points of the monitoring object from the enemy may be achieved, and the monitoring object disappears when the health points become 0.

An effect of being attacked occurs in the monitoring object from the enemy.

In the object scanning method based on a mobile terminal provided in this embodiment, a mobile terminal MOBA may be played by using a dewarding method, and a process in which dewarding grows out of nothing. This embodiment implements personalized setting of the application interface by using the scanning button as the scanning entry, so that a user clicks the scanning button to enter a scanning instruction for the monitoring object, to implement a scanning function of an interactive application. This prevents a case in the existing technology in which a user needs to perform complex operations on a mobile terminal before starting a scanning object, and reduces human-computer interactive operations, thereby reducing complexity of operating dewarding of the mobile terminal MOBA. In this way, a player of the mobile terminal MOBA can focus more energy on other places while performing dewarding.

Figure 7A:
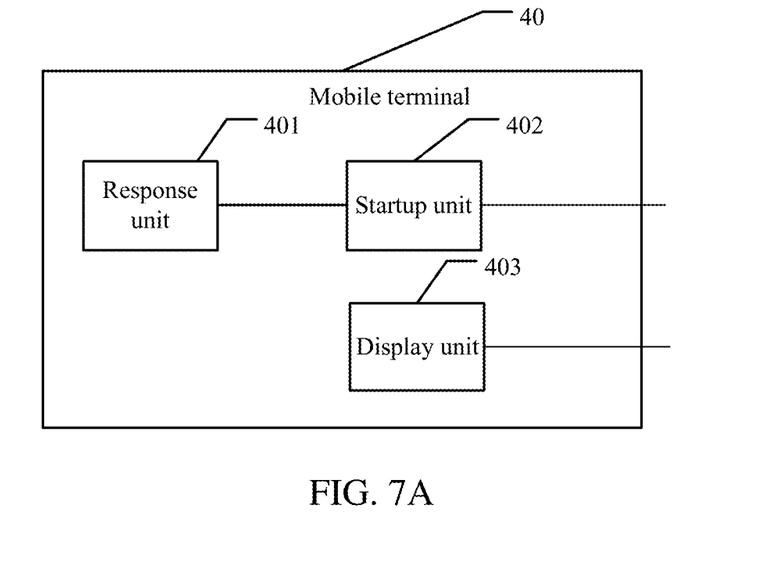
FIGS. 7A, 7B and 8 through 10 are schematic diagrams of a mobile terminal according to various embodiments.

FIG. 7A illustrates a mobile terminal 40 according to an embodiment. As illustrated, the mobile terminal 40 includes:
a response unit 401, configured to respond to a scanning instruction for a monitoring object that is entered by a user by using a scanning entry in an application interface;
a startup unit 402, configured to starting, according to the scanning instruction for the monitoring object responded to by the response unit 401, a scanning object for scanning the monitoring object; and
a display unit 403, configured to display the scanning object, a scanning range of the scanning object, a scanned monitoring object in the scanning range, and a remaining life value of the scanned monitoring object.

In contrast to other methods which require complex operations to interact with an application on a mobile terminal, in the object scanning method based on a mobile terminal that is provided in this embodiment, a scanning instruction for a monitoring object that is entered by using a scanning entry in an application interface is used, and further a scanning object for scanning the monitoring object is started, to implement an operation of an interactive application. The object scanning method implements personalized setting of the application interface by using the scanning entry, so that a user only needs to enter the scanning instruction for the monitoring object into the scanning entry to implement the scanning function of the interactive application. This prevents a case in the related technology in which a user needs to perform complex operations on a mobile terminal before starting the scanning object, and reduces human-computer interactive operations, thereby reducing complexity of operating the interactive application on the mobile terminal.

Figure 7B:
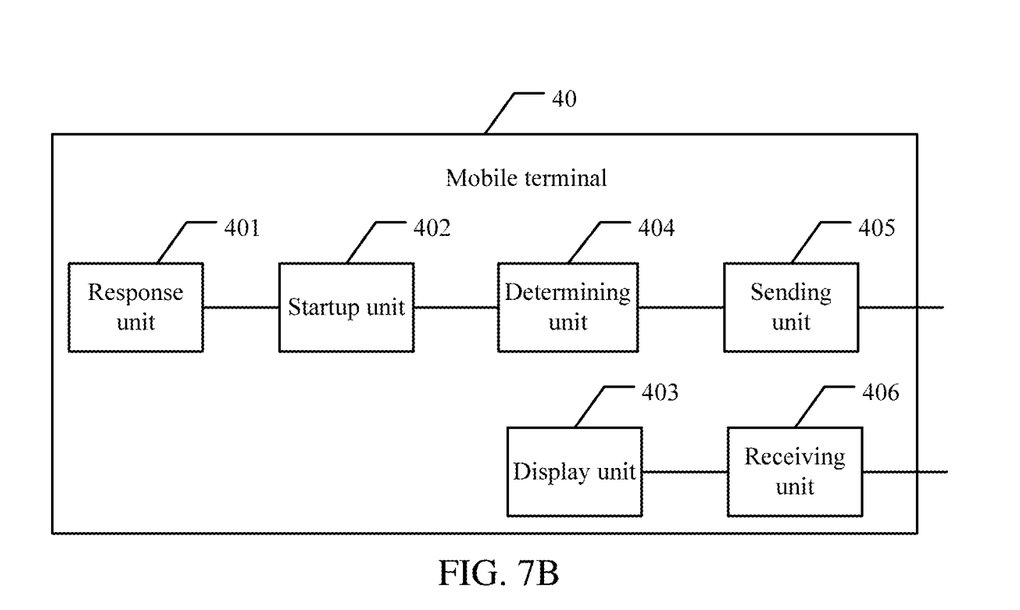

FIG. 7B illustrates a mobile terminal 40 according to another embodiment. As illustrated, the mobile terminal further includes:
a determining unit 404, configured to determine synchronous data, the synchronous data including the scanning object started by the startup unit 402, a scanning range of the scanning object, a scanned monitoring object in the scanning range, and a remaining life value of the scanned monitoring object;
a sending unit 405, configured to send the synchronous data determined by the determining unit 404 to a server, so that the server checks the synchronous data; and
a receiving unit 406, configured to receive an instruction indicating that the synchronous data is successfully checked, where
the display unit 403 is triggered when the receiving unit 406 receives the instruction indicating that the synchronous data is successfully checked.

In an implementation, the display unit 403 is configured to: display the scanning object above a main simulated object in the application interface, display the scanning range by using a location of the main simulated object as a center, and display the scanned monitoring object in the scanning range and the remaining life value of the scanned monitoring object.

Figure 8:
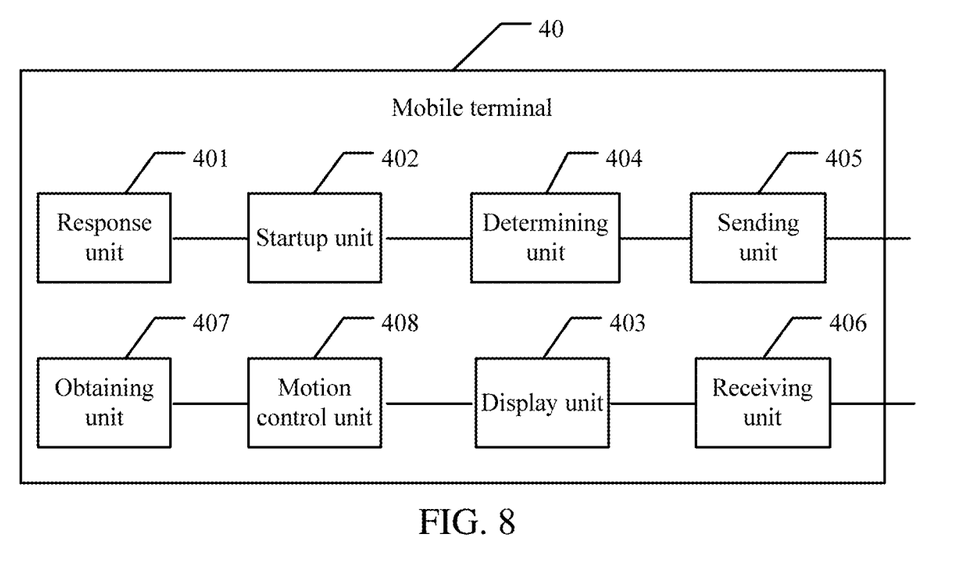

FIG. 8 illustrates a mobile terminal 40 according to another embodiment. As illustrated, the mobile terminal 40 provided in this embodiment further includes an obtaining unit 407 and a motion control unit 408.

The obtaining unit 407 is configured to obtain a motion trajectory of the main simulated object.

The motion control unit 408 is configured to move the scanning object and the scanning range according to the motion trajectory obtained by the obtaining unit 407.

The display unit 403 is further configured to display the main simulated object, the scanning object, and the scanning range after the movement control by the motion control unit 408.

In an implementation, the determining unit 404 is further configured to determine the remaining life value of the scanned monitoring object according to a scanning time and a speed at which the scanning object reduces health points of the scanned monitoring object.

The display unit 403 is further configured to display the remaining life value of the scanned monitoring object that is determined by the determining unit 404, and control, when the remaining life value is 0, the scanned monitoring object to disappear from the application interface.

Figure 9:
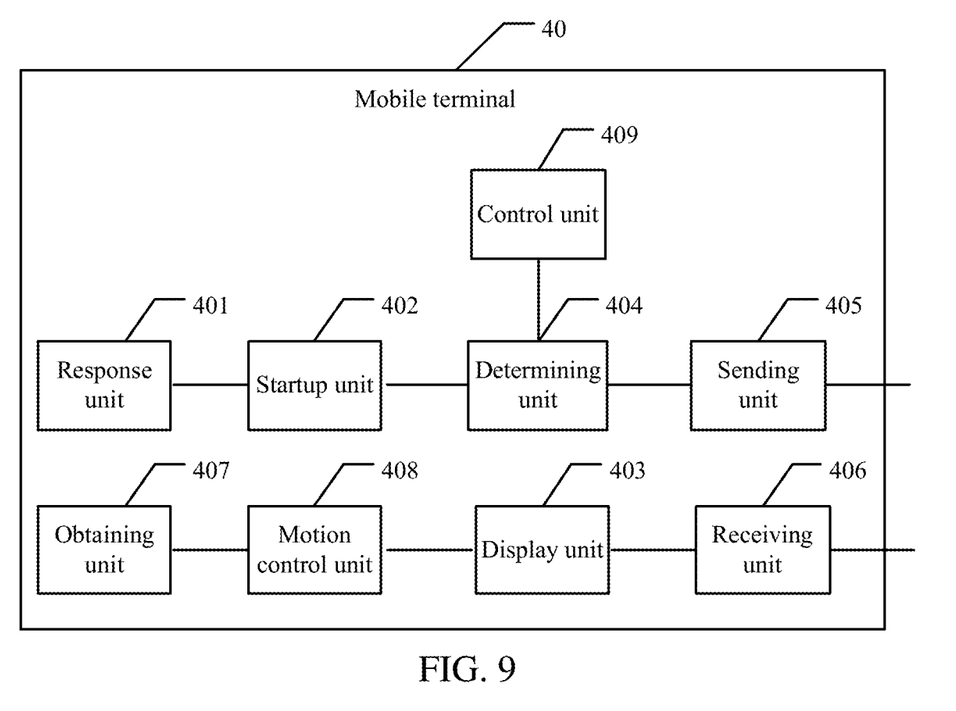

FIG. 9 illustrates a mobile terminal 40 according to another embodiment. As illustrated, the mobile terminal 40 further includes a control unit 409.

The control unit 409 is configured to: control, when there are at least two scanned monitoring objects in the scanning range that are determined by the determining unit 404, the scanning object to reduce health points of the at least two scanned monitoring objects in an order of reduction priorities, a reduction priority of a monitoring object with a smaller remaining life value being higher than a reduction priority of a monitoring object with a larger remaining life value; and reduce the health points of the at least two scanned monitoring objects in an order of remaining existence durations of the scanned monitoring objects when the remaining life values of the at least two scanned monitoring objects are the same.

In an implementation, the startup unit 402 is configured to:

determine, according to input frequency and a usage state of the scanning instruction, whether the scanning object is currently available; and start, according to the scanning instruction for the monitoring object when the input frequency of the scanning instruction meets a preset rule and the usage state indicates availability, the scanning object for scanning the monitoring object.

For understanding of the mobile terminal provided in this embodiment, refer to the descriptions of FIG. 1 to FIG. 6. The details are not described herein again.

Figure 10:
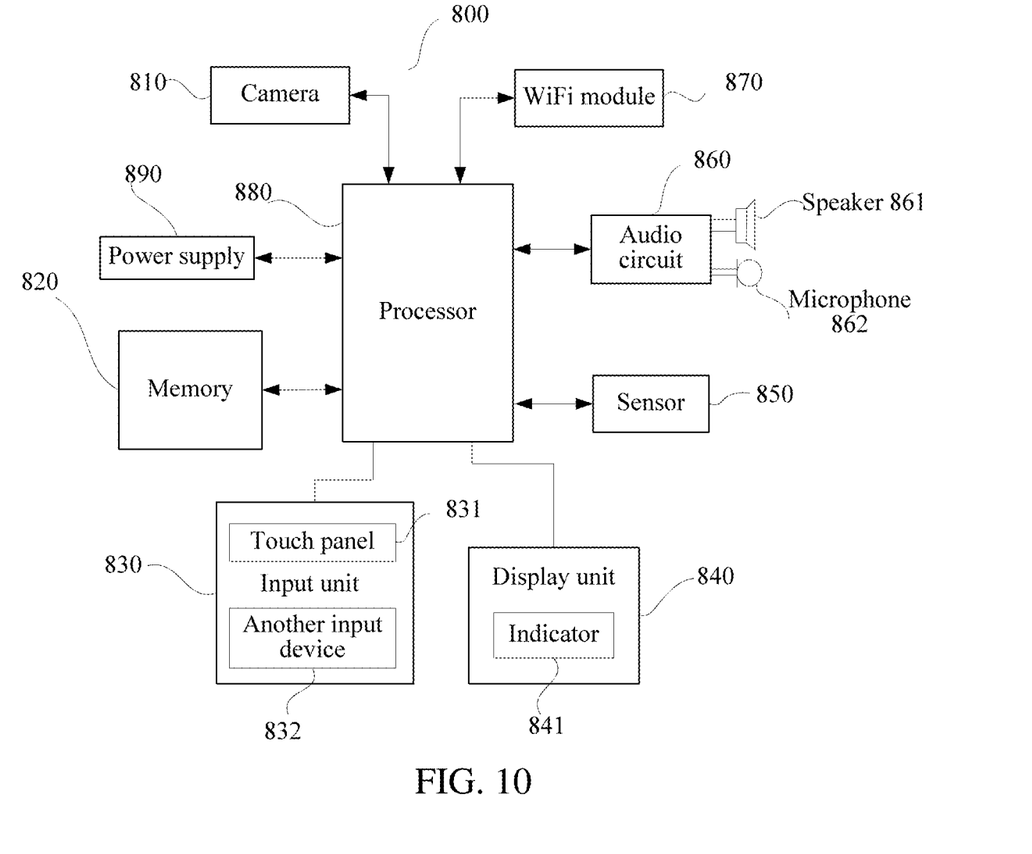

According to yet another embodiment, the mobile terminal may be a mobile terminal. The mobile terminal may be a mobile phone. As shown in FIG. 10, for ease of description, only parts related to this embodiment are shown. For specific technical details that are not disclosed, refer to the method part in this embodiment.

FIG. 10 is a block diagram of a partial structure of a mobile terminal 800 according to an embodiment. Referring to FIG. 10, the mobile terminal includes components such as a camera 810, a memory 820, an input unit 830, a display unit 840, a sensor 850, an audio circuit 860, a WiFi module 870, a processor 880, and a power supply 890. A person skilled in the art may understand that, the structure of the mobile terminal shown in FIG. 10 does not constitute a limitation to the mobile terminal. The mobile terminal may include more components or fewer components than those shown in the figure, or some components may be combined, or a different component deployment may be used.

The following describes the components of the mobile terminal in detail with reference to FIG. 10.

The camera 810 may be configured to generate image data based on light incident on the camera 810.

The memory 820 may be configured to store a software program and module. The processor 880 runs the software program and module stored in the memory 820, to implement various functional applications and data processing of the mobile terminal. The memory 820 may mainly include a program storage area and a data storage area. The program storage area may store an operating system, an application program required by at least one function (such as a sound playback function and an image display function), and the like. The data storage area may store data (such as audio data and an address book) created according to use of the mobile terminal, and the like. In addition, the memory 820 may include a high speed random access memory, and may further include a non-volatile memory, such as at least one magnetic disk storage device, a flash memory, or other volatile solid-state storage devices.

The input unit 830 may be configured to: receive an operation instruction of a user, such as a scanning input instruction, and generate a key signal input related to the user setting and function control of the mobile terminal 800. Specifically, the input unit 830 may include a touch panel 831 and another input device 832. The touch panel 831, which may also be referred to as a touchscreen, may collect a touch operation of a user on or near the touch panel (such as an operation of a user on or near the touch panel 831 by using any suitable object or accessory such as a finger or a stylus), and drive a corresponding connection mobile terminal according to a preset program. Optionally, the touch panel 831 may include two parts: a touch detection mobile terminal and a touch controller. The touch detection mobile terminal detects a touch position of the user, detects a signal generated by the touch operation, and transfers the signal to the touch controller. The touch controller receives the touch information from the touch detection mobile terminal, converts the touch information into touch point coordinates, then sends the touch point coordinates to the processor 880, and can receive and execute a command sent by the processor 880. In addition, the touch panel 831 may be a resistive, capacitive, infrared, or surface sound wave type touch panel. In addition to the touch panel 831, the input unit 830 may further include the another input device 832. Specifically, the another input device 832 may include, but is not limited to, one or more of a physical keyboard, a functional key (such as a volume control key or a switch key), a track ball, a mouse, and a joystick.

The display unit 840 may be configured to display an application interface. The display unit 840 may include an indicator 841. Optionally, the indicator 841 may be configured by using a liquid crystal display (LCD) or an organic light-emitting diode (OLED), or in another form. Further, the touch panel 831 may cover the indicator 841. After detecting a touch operation on or near the touch panel 831, the touch panel 831 transfers the touch operation to the processor 880, so as to determine a type of a touch event. The processor 880 then provides a corresponding visual output on the indicator 841 according to the type of the touch event. Although in FIG. 10, the touch panel 831 and the indicator 841 are used as two separate parts to implement input and output functions of the mobile terminal, in some embodiments, the touch panel 831 and the indicator 841 may be integrated to implement the input and output functions of the mobile terminal.

The mobile terminal 800 may further include at least one sensor 850.

The audio circuit 860, a speaker 861, and a microphone 862 may provide audio interfaces between the user and the mobile terminal. The audio circuit 860 may convert received audio data into an electric signal and transmit the electric signal to the speaker 861. The speaker 861 converts the electric signal into a sound signal for output. On the other hand, the microphone 862 converts a collected sound signal into an electric signal. The audio circuit 860 receives the electric signal and converts the electric signal into audio data, and outputs the audio data to the processor 880 for processing. Then, the processor 880 sends the audio data to, for example, another mobile terminal by using the camera 810, or outputs the audio data to the memory 820 for further processing.

The WiFi module 870 may be configured to perform communication.

The processor 880 is a control center of the mobile terminal, and is connected to various parts of the mobile terminal by using various interfaces and lines. By running or executing the software program and/or module stored in the memory 820, and invoking data stored in the memory 820, the processor 880 performs various functions and data processing of the mobile terminal, thereby performing overall monitoring on the mobile terminal. Optionally, the processor 880 may include one or more processing units. The processor 880 may integrate an application processor and a modem processor. The application processor mainly processes an operating system, a user interface, an application program, and the like. The modem processor mainly processes wireless communication. It may be understood that the foregoing modem processor may alternatively not be integrated into the processor 880.

The mobile terminal 800 further includes the power supply 890 (such as a battery) for supplying power to the components. In an implementation, the power supply may be logically connected to the processor 880 by using a power management system, thereby implementing functions such as charging, discharging and power consumption management by using the power management system.

Although not shown in the figure, the mobile terminal 800 may further include a radio frequency (RF) circuit, a Bluetooth module, and the like, which are not further described herein.

In this embodiment, the processor 880 included in the mobile terminal when the mobile terminal performs object scanning further has the following functions:

responding to a scanning instruction for a monitoring object that is entered by a user by using a scanning entry in an application interface;

starting, according to the scanning instruction for the monitoring object, a scanning object for scanning the monitoring object; and displaying the scanning object, a scanning range of the scanning object, a scanned monitoring object in the scanning range, and a remaining life value of the scanned monitoring object.

In an implementation, after the starting, according to the scanning instruction for the monitoring object, a scanning object for scanning the monitoring object, the processor 880 may further control:

determining synchronous data, the synchronous data including the scanning object, a scanning range of the scanning object, a scanned monitoring object in the scanning range, and a remaining life value of the scanned monitoring object;

sending the synchronous data to a server, so that the server checks the synchronous data; and performing, after an instruction indicating that the synchronous data is successfully checked is received, the step of displaying the scanning object, a scanning range of the scanning object, a scanned monitoring object in the scanning range, and a remaining life value of the scanned monitoring object.

In an implementation, the displaying the scanning object, a scanning range of the scanning object, a scanned monitoring object in the scanning range, and a remaining life value of the scanned monitoring object includes: displaying the scanning object above a main simulated object in the application interface, displaying the scanning range by using a location of the main simulated object as a center, and displaying the scanned monitoring object in the scanning range and the remaining life value of the scanned monitoring object.

In an implementation, the functions further include: obtaining a motion trajectory of the main simulated object; controlling a movement of the scanning object and the scanning range according to the motion trajectory; and displaying the main simulated object, the scanning object, and the scanning range after the movement.

In an implementation, the functions further include: determining the remaining life value of the scanned monitoring object according to a scanning time and a speed at which the scanning object reduces health points of the scanned monitoring object; and displaying the remaining life value of the scanned monitoring object, and controlling, when the remaining life value is 0, the scanned monitoring object to disappear from the application interface.

In an implementation, the functions further include: controlling, when there are at least two scanned monitoring objects in the scanning range, the scanning object to reduce health points of the at least two scanned monitoring objects in an order of reduction priorities, a reduction priority of a monitoring object with a smaller remaining life value being higher than a reduction priority of a monitoring object with a larger remaining life value; and reducing the health points of the at least two scanned monitoring objects in an order of remaining existence durations of the scanned monitoring objects when the remaining life values of the at least two scanned monitoring objects are the same.

In an implementation, the starting, according to the scanning instruction for the monitoring object, a scanning object for scanning the monitoring object includes:

determining, according to input frequency and a usage state of the scanning instruction, whether the scanning object is currently available; and starting, according to the scanning instruction for the monitoring object when the input frequency of the scanning instruction meets a preset rule and the usage state indicates availability, the scanning object for scanning the monitoring object. For understanding of the mobile terminal provided in this embodiment, refer to the corresponding descriptions of FIG. 1 to FIG. 6. The details are not described herein again.

An embodiment provides a storage medium, the storage medium being configured to store program code, the program code being used for performing any object scanning method according to an object scanning device based on a mobile terminal.

An embodiment provides a computer program product including an instruction, when the computer program product runs on a computer, the computer performing any object scanning method according to an object scanning device based on a mobile terminal.

A person of ordinary skill in the art may understand that all or some of the steps of the methods in the embodiments may be implemented by a program instructing relevant hardware. The program may be stored in a computer readable storage medium. The storage medium may include: a read-only memory (ROM), a random-access memory (RAM), a magnetic disk, or an optical disc.

The object scanning method based on a mobile terminal and a mobile terminal provided by the embodiments are described in detail above, and this specification applies specific examples to explain embodiments of the this application. The foregoing descriptions of the embodiments are merely intended to help understand the method and core idea. In addition, to a person of ordinary skill in the art, changes can be made on the specific implementations and application range according to the idea. In conclusion, the content of this specification should not be construed as a limitation on this application.

What is claimed is:

1. A method performed by one or more processors of a mobile terminal, the method comprising:
   identifying a monitoring object based on a scanning instruction that is entered in an application interface;
   starting, based on the scanning instruction, a scanning object for scanning the monitoring object; and
   displaying the scanning object, a scanning range of the scanning object, a scanned monitoring object in the scanning range, and a remaining life value of the scanned monitoring object.

2. The method according to claim 1, further comprising, after the starting and based on the scanning instruction:
   determining synchronous data comprising the scanning object, the scanning range of the scanning object, the scanned monitoring object in the scanning range, and the remaining life value of the scanned monitoring object;
   sending the synchronous data to a server, so that the server checks the synchronous data; and
   receiving an instruction indicating that the synchronous data is successfully checked from the server,
   wherein the displaying the scanning object, the scanning range of the scanning object, the scanned monitoring object in the scanning range, and the remaining life value of the scanned monitoring object are performed after receiving the instruction.

3. The method according to claim 2, wherein the displaying the scanning object, the scanning range of the scanning object, the scanned monitoring object in the scanning range, and the remaining life value of the scanned monitoring object comprises:
   displaying the scanning object above a main simulated object in the application interface;
   displaying the scanning range by using a location of the main simulated object as a center; and
   displaying the scanned monitoring object in the scanning range and the remaining life value of the scanned monitoring object.

4. The method according to claim 3, wherein the method further comprises:
   obtaining a motion trajectory of the main simulated object;
   controlling a movement of the scanning object and the scanning range according to the motion trajectory; and
   displaying the main simulated object, the scanning object, and the scanning range after the movement.

5. The method according to claim 4, wherein the method further comprises:
   determining the remaining life value of the scanned monitoring object according to a scanning time and a speed at which the scanning object reduces health points of the scanned monitoring object; and
   displaying the remaining life value of the scanned monitoring object, and controlling, when the remaining life value is 0, the scanned monitoring object to disappear from the application interface.

6. The method according to claim 4, wherein the monitoring object is one of a plurality of monitoring objects in the scanning range, and the method further comprises:
   controlling the scanning object to reduce health points of each of the plurality of monitoring objects in the scanning range in an order of reduction priorities, a reduction priority of a monitoring object with a smaller remaining life value being higher than a reduction priority of a monitoring object with a larger remaining life value; and
   reducing the health points of each of the plurality of monitoring objects in the scanning range in an order of remaining existence durations of the scanned monitoring objects when remaining life values of the plurality of monitoring objects in the scanning range are the same.

7. The method according to claim 4, wherein the starting comprises:
   determining, according to input frequency and a usage state of the scanning instruction, whether the scanning object is available; and
   starting, based on the input frequency of the scanning instruction meeting a preset rule and the usage state indicates availability, the scanning object for scanning the monitoring object.

8. A mobile terminal comprising:
   at least one memory operable to store program code; and
   at least one processor operable to read the program code, and operate as instructed by the program code to control the mobile terminal to:
   identify a monitoring object based on a scanning instruction that is entered in an application interface;
   start, based on the scanning instruction, a scanning object for scanning the monitoring object; and
   display the scanning object, a scanning range of the scanning object, a scanned monitoring object in the scanning range, and a remaining life value of the scanned monitoring object.

9. The mobile terminal according to claim 8, wherein the program code is further configured to cause the at least one processor to:
   determine synchronous data comprising the scanning object, the scanning range of the scanning object, the scanned monitoring object in the scanning range, and the remaining life value of the scanned monitoring object;
   send the synchronous data to a server, so that the server can check the synchronous data; and receive an instruction indicating that the synchronous data is successfully checked from the server, wherein the display of the scanning object is triggered based on the instruction indicating that the synchronous data is successfully checked.

10. The mobile terminal according to claim 9, wherein the program code is further configured to cause the at least one processor to:

display the scanning object above a main simulated object in the application interface;

display the scanning range by using a location of the main simulated object as a center; and display the scanned monitoring object in the scanning range and the remaining life value of the scanned monitoring object.

11. The mobile terminal according to claim 10, wherein the program code is further configured to cause the at least one processor to:

obtain a motion trajectory of the main simulated object;

move the scanning object and the scanning range according to the motion trajectory; and display the main simulated object, the scanning object, and the scanning range after movement of the scanning object and the scanning range.

12. The mobile terminal according to claim 11, wherein the program code is further configured to cause the at least one processor to:

determine the remaining life value of the scanned monitoring object according to a scanning time and a speed at which the scanning object reduces health points of the scanned monitoring object; and display the remaining life value of the scanned monitoring object, and control, when the remaining life value is 0, the scanned monitoring object to disappear from the application interface.

13. The mobile terminal according to claim 11, wherein the monitoring object is one of a plurality of monitoring objects in the scanning range, and wherein the program code is further configured to cause the at least one processor to:

control the scanning object to reduce health points of each of the plurality of monitoring objects in the scanning range in an order of reduction priorities, a reduction priority of a monitoring object with a smaller remaining life value being higher than a reduction priority of a monitoring object with a larger remaining life value; and reduce the health points of each of the plurality of monitoring objects in the scanning range in an order of remaining existence durations of the scanned monitoring objects when remaining life values of the plurality of monitoring objects in the scanning range are the same.

14. The mobile terminal according to claim 11, wherein the program code is further configured to cause the at least one processor to:

determine, according to input frequency and a usage state of the scanning instruction, whether the scanning object is available; and start, based on the input frequency of the scanning instruction meeting a preset rule and the usage state indicates availability, the scanning object for scanning the monitoring object.

15. A non-transitory computer-readable storage medium having stored therein a computer readable code configured to, when executed by a computer, cause the computer to perform:

identifying a monitoring object based on a scanning instruction that is entered in an application interface;

starting, based on the scanning instruction, a scanning object for scanning the monitoring object; and displaying the scanning object, a scanning range of the scanning object, a scanned monitoring object in the scanning range, and a remaining life value of the scanned monitoring object.

16. The non-transitory computer-readable storage medium according to claim 15, wherein the computer readable code is further configured to, when executed by the computer, cause the computer to perform, after the starting and based on the scanning instruction:

determining synchronous data comprising the scanning object, the scanning range of the scanning object, the scanned monitoring object in the scanning range, and the remaining life value of the scanned monitoring object;

sending the synchronous data to a server, so that the server checks the synchronous data; and receiving an instruction indicating that the synchronous data is successfully checked from the server, wherein the displaying the scanning object, the scanning range of the scanning object, the scanned monitoring object in the scanning range, and the remaining life value of the scanned monitoring object are performed after receiving the instruction.

17. The non-transitory computer-readable storage medium according to claim 16, wherein the displaying the scanning object, the scanning range of the scanning object, the scanned monitoring object in the scanning range, and the remaining life value of the scanned monitoring object comprises:

displaying the scanning object above a main simulated object in the application interface;

displaying the scanning range by using a location of the main simulated object as a center; and displaying the scanned monitoring object in the scanning range and the remaining life value of the scanned monitoring object.

18. The non-transitory computer-readable storage medium according to claim 17, wherein the computer readable code is configured to, when executed by the computer, cause the computer to perform:

obtaining a motion trajectory of the main simulated object;

controlling a movement of the scanning object and the scanning range according to the motion trajectory; and displaying the main simulated object, the scanning object, and the scanning range after the movement.

19. The non-transitory computer-readable storage medium according to claim 18, wherein the computer readable code is configured to, when executed by the computer, cause the computer to perform:

determining the remaining life value of the scanned monitoring object according to a scanning time and a speed at which the scanning object reduces health points of the scanned monitoring object; and displaying the remaining life value of the scanned monitoring object, and controlling, when the remaining life value is 0, the scanned monitoring object to disappear from the application interface.

20. The non-transitory computer-readable storage medium according to claim 18, wherein the monitoring object is one of a plurality of monitoring objects in the scanning range, and wherein the computer readable code is configured to, when executed by the computer, cause the computer to perform:
controlling the scanning object to reduce health points of each of the plurality of monitoring objects in the scanning range in an order of reduction priorities, a reduction priority of a monitoring object with a smaller remaining life value being higher than a reduction priority of a monitoring object with a larger remaining life value; and
reducing the health points of each of the plurality of monitoring objects in the scanning range in an order of remaining existence durations of the scanned monitoring objects when remaining life values of the plurality of monitoring objects in the scanning range are the same.

* * * * *